United States Patent
Prins et al.

(10) Patent No.: US 10,305,616 B2
(45) Date of Patent: May 28, 2019

(54) METHOD OF SYNCHRONISING CLOCKS OF NETWORK DEVICES

(71) Applicant: Robert Bosch GmbH, Stuttgart (DE)

(72) Inventors: Anton Prins, Son en Breugel (NL); Hans S. P. Van Der Schaar, Breda (NL)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/535,486

(22) PCT Filed: Dec. 16, 2014

(86) PCT No.: PCT/EP2014/078034
§ 371 (c)(1),
(2) Date: Jun. 13, 2017

(87) PCT Pub. No.: WO2016/095972
PCT Pub. Date: Jun. 23, 2016

(65) Prior Publication Data
US 2017/0346588 A1 Nov. 30, 2017

(51) Int. Cl.
*H04J 3/06* (2006.01)
*H04W 56/00* (2009.01)
*H04W 84/20* (2009.01)

(52) U.S. Cl.
CPC ......... *H04J 3/0667* (2013.01); *H04W 56/001* (2013.01); *H04W 84/20* (2013.01)

(58) Field of Classification Search
CPC .... H04J 3/0667; H04W 56/001; H04W 84/20
See application file for complete search history.

(56) References Cited

U.S. PATENT DOCUMENTS

| 7,191,354 | B2* | 3/2007 | Purho | G06F 1/14 |
| | | | | 713/400 |
| 7,415,044 | B2* | 8/2008 | Kallstenius | H04J 3/0667 |
| | | | | 370/252 |
| 7,613,212 | B1* | 11/2009 | Raz | H04J 3/0641 |
| | | | | 370/510 |
| 10,009,862 | B1* | 6/2018 | Malovany | H04W 56/001 |

(Continued)

FOREIGN PATENT DOCUMENTS

| CN | 102237997 A | 11/2011 |
| CN | 102668424 A | 9/2012 |

(Continued)

OTHER PUBLICATIONS

International Search Report for Application No. PCT/EP2014/078034 dated Sep. 18, 2015 (3 pages).

*Primary Examiner* — Ivan O Latorre
(74) *Attorney, Agent, or Firm* — Michael Best & Friedrich LLP

(57) ABSTRACT

A method of synchronizing clocks of network device, preferably in a non-deterministic network with a channel access method, wherein it is not possible to determine a time needed for a network device to access the non-deterministic network, wherein each network device comprises at least one clock, wherein a first clock of a first network device and a second clock of a second network device differ by an offset and the offset changes over time due to a drift and wherein the second clock of a second network device (200) shall be synchronized with the first clock of the first network device.

13 Claims, 3 Drawing Sheets

(56) References Cited

U.S. PATENT DOCUMENTS

| | | | | |
|---|---|---|---|---|
| 2002/0129290 | A1* | 9/2002 | Couillard | G06F 1/14 |
| | | | | 713/400 |
| 2002/0136198 | A1* | 9/2002 | Findikli | H04J 3/0685 |
| | | | | 370/350 |
| 2003/0097604 | A1* | 5/2003 | Inohara | G06F 1/04 |
| | | | | 713/600 |
| 2004/0141526 | A1* | 7/2004 | Balasubramanian | H04J 3/0667 |
| | | | | 370/503 |
| 2006/0080575 | A1* | 4/2006 | Golparian | G06F 1/12 |
| | | | | 714/12 |
| 2010/0115047 | A1* | 5/2010 | Briscoe | G06F 1/12 |
| | | | | 709/208 |
| 2010/0238917 | A1 | 9/2010 | Silverman et al. | |
| 2011/0051847 | A1* | 3/2011 | Flury | H04L 7/0054 |
| | | | | 375/316 |
| 2011/0296226 | A1 | 12/2011 | Sorbara et al. | |
| 2012/0159001 | A1 | 6/2012 | Liu et al. | |
| 2013/0013811 | A1* | 1/2013 | Liu | G06F 1/14 |
| | | | | 709/248 |
| 2013/0336341 | A1* | 12/2013 | Kamada | H04J 3/0667 |
| | | | | 370/503 |
| 2016/0119070 | A1* | 4/2016 | Wang | H04J 3/0667 |
| | | | | 370/503 |
| 2016/0269168 | A1* | 9/2016 | Carstens | A47G 29/141 |
| 2017/0330278 | A1* | 11/2017 | Radulescu | G06Q 40/04 |

FOREIGN PATENT DOCUMENTS

| | | |
|---|---|---|
| EA | 006841 B1 | 4/2006 |
| EP | 1239620 | 9/2002 |
| JP | H11136224 A | 5/1999 |
| JP | 2000332802 A | 11/2000 |
| JP | 2005253033 A | 9/2005 |
| KR | 101176798 | 8/2012 |

* cited by examiner

METHOD OF SYNCHRONISING CLOCKS OF NETWORK DEVICES

BACKGROUND OF THE INVENTION

The invention relates to a method of synchronising clocks of network devices.

To transmit low-latency time-sensitive data, particularly in a non-deterministic network, particularly a wireless network, it is required to keep the clock of a transmitter and a receiver synchronized. Particularly the data clocks, used for the transfer of the data, have to be synchronised.

Various protocols are available to achieve synchronisation of clocks; some examples are NTPv3 (Network Time Protocol), IEEE1588 (Precision Time Protocol, PTP) or its derivates 802.1AS (Timing and Synchronization for Time-Sensitive Applications in Bridged Local Area Networks) and 802.11v (Wireless LAN). Solutions to synchronise data clocks in a wired network derive the data clock from the system clock, which is kept synchronous.

For synchronising two clocks, two values or parameters are of special importance: The offset and the drift. The offset is an instantaneous difference between two clocks. The drift is an increase of this offset over time. The offset usually also takes in account a delay time (also referred to as transmit delay time or transfer delay time). This delay time is the time it takes to transmit data between the transmitter and the receiver. Offset and drift have to be zero for clocks to be in synchronisation. Particularly, the offset and drift of a slave clock is adjusted to zero in order to synchronise this slave clock with a master clock.

In known implementations for wired networks, the drift is used to compensate the offset and create a control-loop. A convergence time of this control-loop depends on the absolute offset, including the delay time. Usually, a certain time is required to reach the lock state, time to drift until the offset of the slave system clock is zero. If the offset is large, the initial drift takes a long time. Thus it can take a long time until two clocks are synchronised.

An often used solution is a hard adjustment of the slave system clock. However, this can have (stability) consequences for clocks, which are derived from this system clock. Furthermore, the use of the system clock potentially introduces unwanted behaviour, for example all derived clocks (also referred to as peripherals) will have a "variable" frequency instead of only the clock that requires the synchronisation.

Moreover, these known implementations were designed for wired networks and are usually not compatible with non-deterministic networks. In non-deterministic networks, a channel access method allows several terminals connected to the same multi-point transmission medium to transmit over it and to share its capacity. Several network devices share the same medium. Particularly, non-deterministic networks are wireless networks, bus networks, ring networks, star networks or half-duplex point-to-point links.

With this multitude of network devices sharing the medium of the non-deterministic networks, it is not possible to determine, whether a network device can access the medium. Moreover, it is difficult or can even be impossible to predict, whether a network device is able to transmit data over the non-deterministic network, introducing variable (non-deterministic) latency in data transmission.

Because of the non-determinism of these kinds of networks, non-deterministic networks need a different method of synchronising clocks of network devices than more deterministic networks. Hence, the aim of the invention is to provide a method of synchronising clocks of network devices in a non-deterministic network in a short time and without stability problems for the network devices.

SUMMARY OF THE INVENTION

According to the invention, a method of synchronising clocks of network devices, preferably in a non-deterministic network, is suggested.

According to the invention, at least the clock of a first network device and the clock of a second network device in a non-deterministic network comprising a plurality of network devices shall be synchronised.

Non-deterministic networks are especially networks, with a (multiple) channel access method, i.e. networks, wherein it is not possible to determine a time needed for a network device to access the non-deterministic network. Preferably, it is not possible to determine, whether a network device can access the non-deterministic network. Moreover, it is not possible to determine with certainty, whether a network device can transmit data over the non-deterministic network (variable, not predictable latency).

Each network device comprises at least one clock, particularly at least two clocks. Particularly, one clock of a network device is a CPU clock, i.e. a master clock of the corresponding network device. Particularly, another clock of a network device is a data clock, especially a time-sensitive data clock. This data clock is used for data transfer.

Particularly, one of the network devices is a master. This master comprises a master time basis, with which the other network devices (which are considered to be slaves) shall be synchronised. In order to transmit data over the non-deterministic network, the data clocks of the slaves have to be synchronised with the clock of the master.

Particularly, the first network device is considered to be the master and the second network device is considered to be a slave. The first clock of the first network device is considered to be the master clock. The second clock of the second network device is considered to be slave clock. The slave clock is adjusted in order to adapt this second clock of the slave to the master clock of the master. The master clock of the master can be a data clock, a time-sensitive master clock and/or a CPU clock.

The essence of the invention comprises three different aspects. A first aspect of the invention is that the network is non-deterministic. Particularly, the first aspect comprises that the slave clock of a slave shall be synchronised with the master clock of the non-deterministic network, introducing variable (non-deterministic) latency in data transmission.

A second aspect of the invention is that this slave clock is decoupled from any other clock in the non-deterministic network. According to this aspect of the invention, all the clocks of all the network devices are decoupled from each other. Particularly, each clock of a single network device is decoupled from all the other clocks of said network device, as well as decoupled from any other clock of any other network device.

The slave clock of the slave (i.e. the second clock of the second network device) is synchronised with the master clock of the master (i.e. the first clock of the first network device). Hence, this slave clock is adapted independently and separately from any other clocks of the second network device and separately from any other clock of any other network device. Thus, the slave clock is decoupled from any other clock of the network device.

According to the invention, this slave clock is decoupled from the slave's system clock or local clock respectively, particularly from the slave's CPU clock. Hence, the slave's local/system clock is not adjusted in the course of the method according to the invention and does not need to be adapted in order to synchronise the slave clock and the master clock. This gives more stability to the system of the slave and to other clocks, derived from the local/system clock. This decoupling of the clocks provides numerous advantages and possibilities. Thus, smooth adjustments can be made to the data clock. It is also possible to have multiple data clocks of different rates.

A third aspect of the invention is that the synchronisation of the clocks is achieved via a stable situation. In particular, in order to synchronise the slave clock and the master clock, the drift between slave clock and master clock is determined and compensated for. With this drift compensated, the slave clock and the master clock are in said stable situation.

By adjusting the slave clock accordingly, the drift is compensated for. Particularly, this drift compensation is accomplished in a single update of the slave clock. By this update, the slave clock is forced into a stable situation. For this update, a relation between a control signal and a clock deviation must be known. Particularly, this control signal is a signal, with which the slave clock is adjusted, particularly by the clock deviation. After this update, the master clock and the slave clock are in a stable situation and hence there is no drift between these two clocks.

Thus, the invention does not use continuous drift compensation or a continuous control-loop to adapt the two clocks until they finally converge and are in synchronisation. The invention rather uses a step-based approach. According to the invention, the drift is determined directly and is compensated for specifically. This way, synchronisation of the clocks can be achieved in a short time.

Synchronisation is particularly achieved by exchanging appropriate data, particularly appropriate messages and/or requests. This data is especially exchanged in form of data packets, i.e. appropriate synchronisation packets.

Particularly, Time of Day (TOD) is used as an absolute time of the master clock. The Time of Day contains the information year, month, day, hour, minute, second, and nanosecond. Using the Time of Day, time-sensitive data can also be transmitted between different non-deterministic networks.

Preferably, the offset between the master clock and the slave clock is compensated for. After determining the drift and compensating for the drift, the master clock and the slave clock are in a stable situation. However, an (initial) offset between the two clocks will usually be present. This offset is particularly determined and compensated for. Particularly, also the (transfer) delay time is compensated for. Particularly, the delay time does not have to be set specifically, but is compensated for automatically along with the offset.

Offset and delay are compensated by setting the slave clock via an update mechanism. This update mechanism takes in account the period-time of the data clock. One or more complete period-times of the data clock are skipped. Herein, the stable situation is maintained and there is no drift between the master clock and the slave clock.

The offset, particularly the delay compensated offset, is now within a period of the master clock. With the drift being zero, the clocks are now in lock, the master clock and the slave clock are synchronised. In order to maintain this synchronisation over time, an adaptive compensation can be performed.

Preferably, the clocks are synchronised in a step-based approach. In a first step of this step-based approach, an analysing step, the drift of the two clocks is determined. In a second step, a drift compensation step, the drift is compensated for. Particularly, the drift is compensated for in a single update of the slave clock as described above. After the drift compensation in this drift compensation step, the master clock and the slave clock are in a stable situation and hence there is no drift between these two clocks. In a third step, an offset correction step, the offset is determined and compensated for. Particularly, also the (transfer) delay time is compensated for in this offset correction step. The clocks are now in lock, the master clock and the slave clock are synchronised. In order to maintain this synchronisation over time, the adaptive compensation can be performed in a fourth step, an adaptive compensation step.

As mentioned above, the invention does not use an adaptive approach to initially achieve synchronisation, continuous drift compensation or a control-loop to adapt the two clocks until they finally converge and are in synchronisation, but preferably said step-based approach. According to this deterministic approach, the drift as well as the offset are determined directly and are compensated for specifically. This way, synchronisation of the clocks can be achieved in a short time.

Preferably, a change applied to the slave clock is an integer multiple of the slave clock. This way, the clock-edges stay in position while only the counter value (time) changes. The maximum required correction time using the drift is half the period time of the slave clock.

If for example the period time of the slave clock is 1 s and the offset is 5.5 s, five periods are skipped. That means, a change of five times the period of the slave clock (which is the above mentioned integer multiple of the slave clock) is applied. Hence, a change of five times 1 s, i.e. 5 s, is applied. Hence, the corrected offset is only half a second (5.5 s minus 5 s), which is half the period time of the slave clock.

Preferably, the slave clock (i.e. the second clock of the second network device) is a data clock, particularly a time-sensitive data clock. The slave uses this data clock to transmit data over the non-deterministic network. Moreover, the master clock is designed as a time-sensitive master clock. By decoupling each of the clocks from each other according to the invention, the data clock of the slave can be decoupled from any other clock of the slave.

Preferably, the data clock can be decoupled from the system/local clock of the slave, particularly from the CPU clock of the slave. Thus, a time-sensitive data domain of the slave, which is characterised by the data clock, can be decoupled and adjusted separately from a local clock domain of the slave, which is characterised by the system clock, local clock, or CPU clock.

Preferably, time-sensitive data is transmitted via the non-deterministic network. Particularly, time-critical data is transmitted via the non-deterministic network. Particularly, the second network device transmits said time-sensitive data via the non-deterministic network. For example time-sensitive data can be transmitted from the second network device to a third network device. The third network device is synchronised with the first network device, i.e. the master, in the same way as the second network device. This way, the clocks of the second and the third network device are synchronised as well. Hence, the slave clock which is synchronised with the master clock is particularly a time-sensitive data clock. The master clock or the master in general is particularly a time-sensitive data master clock device.

Time-critical data can be low latency and/or time-sensitive data. Time-sensitive data can also be event-driven data, for example measurement or voting data. Such data can for example be transmitted between electronic control units (ECU) via a non-deterministic network.

Preferably, determining the drift between the slave clock and the master clock comprises the following steps: The master transmits two synchronisation messages to the slave. The master sends a first synchronisation message at a first transmission-time. The slave receives that first synchronisation message at a first receive-time. The master sends a second synchronisation message at a second transmission-time. The slave receives that second synchronisation message at a second receive-time. The drift between the master clock and the slave clock is determined taking into account the first and second receive-time as well as the first and second transmission-time.

Preferably, the drift is determined as a difference between the first and second receive-time divided by a difference between the first and second transmission-time. In particular, the drift is determined via the formula:

$$\text{drift} = \frac{T2\text{slave} - T1\text{slave}}{T2\text{master} - T1\text{master}}$$

Preferably, the offset between the slave clock and the master clock is determined by a delay/response request. The master transmits a third synchronisation message at a third transmission-time and the slave receives the third synchronisation message at a third receive-time. Afterwards the slave transmits a delay request at a fourth transmission-time and the master receives the delay request at a fourth receive-time. Offset and delay time are determined by the third receive-time, the third transmission-time, the fourth transmission-time and the fourth receive-time.

BRIEF DESCRIPTION OF THE DRAWINGS

The present invention will now be described further, by way of example, with reference to the accompanying drawings, in which FIG. 1 schematically shows a non-deterministic network with a first, a second and a third network device, which is designed to execute a preferred embodiment of a method according to the invention, and FIG. 2 schematically shows a preferred embodiment of a method according to the invention as a flow chart.

DETAILED DESCRIPTION

Figure 1:
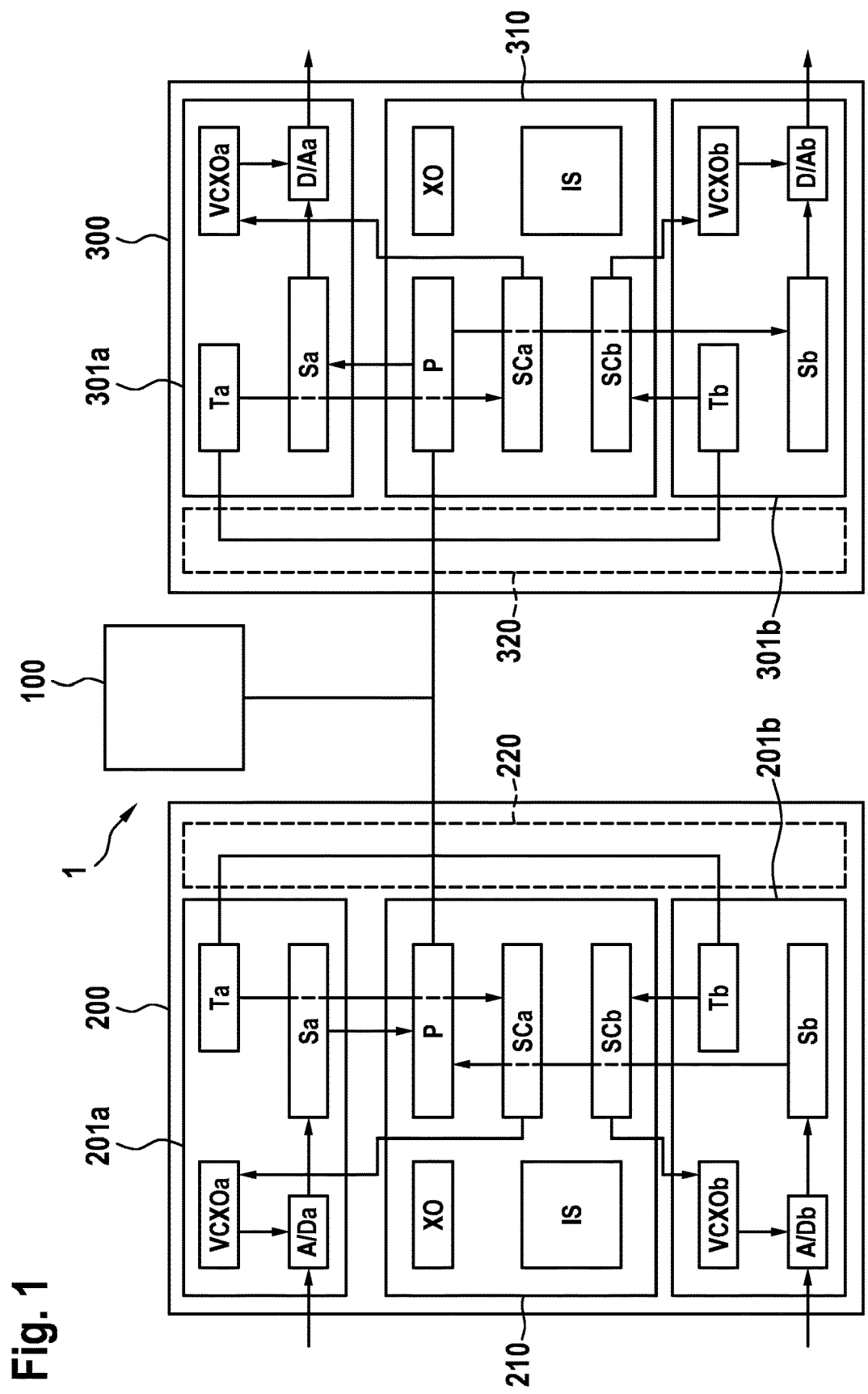

In FIG. 1, a non-deterministic network, which is designed as a wireless network, is schematically depicted and designated as 1.

A first network device is a master 100. The master 100 represents a master clock and is particularly constructed as a time-sensitive master clock device. All other network devices in the wireless network 1 have to be synchronised with the master clock 100. The time or time signal, respectively, distributed by the master is an absolute time. Particularly, this absolute time of the master 100 is a Time of Day (TOD).

In this particular example, there are two other network devices participating in the wireless network, a second network device 200 and a third network device 300. The second network device 200 and the third network device 300 are constructed analogously and comprise the same components. Hereinafter, only the second network device 200 and its components are described in detail. An analogously description is valid for the third network device 300. The references for the third network device 300 are given in brackets in the subsequent description.

Each of the network devices 200 (300) contains a local clock domain 210 (310). The local clock domain 210 (310) represents the system clock and/or local clock, respectively, of the network device 200 (300). Inside the local clock domain 210 (310) an internal software IS is executed. Particularly, the internal software IS is an operating system of the network devices 200 (300). The system/local clock XO is particularly provided by an oscillator. This system/local clock XO is particularly a CPU clock of the network devices 200 (300).

Furthermore, the network device 200 (300) contains time-sensitive data clock domains 201a and 201b (301a and 301b). Each time-sensitive data clock domain 201a and 201b comprises a clock of its own, referred to as time-sensitive data clock. Particularly, this time-sensitive data clock is also given by a controlled crystal oscillator VCXOa and VCXOb, respectively. The time-sensitive data clocks VCXOa and VCXOb of the time-sensitive data clock domains 201a and 201b (301a and 301b) are decoupled from the system clock XO of the local clock domain 210 (310).

Particularly, the time-sensitive data clock domains 201a, 201b, 301a, and 301b are all constructed in the same way and comprise the same components.

In this example, time-sensitive data between the second network device 200 and the third network device 300 shall be exchanged via the wireless network 1. For this data exchange, the second and third network devices 200 and 300 have to be synchronised with the first network device 100. Thus, the network devices 100, 200 and 300 are constructed to execute a preferred embodiment of a method according to the invention.

The system/local clocks of the local clock domains 210 and 310 are not synchronised with the master clock 100. Instead, the time-sensitive data clocks VCXOa/VCXOb of the time sensitive data clock domains 201a, 201b, 301a, and 301b are synchronised with the master clock 100. Hence, the system/local clocks of the local clock domains 210 and 310 are decoupled from the adjustable clocks of the time sensitive data clock domains 201a, 201b, 301a, and 301b.

With the controlling logic, e.g. the operating system IS running in the local clock domain 210 (310) and with the time critical parts, i.e. the time-sensitive data, running in the time-sensitive data clock domain 201a and 201b (301a and 301b), distinct advantages can be achieved and responsibilities can be split. This way, it is possible to establish multiple time-sensitive data clocks at different rates in a single network device 200 (300) and make sure that the local/system clock XO stays stable.

Time-sensitive data can be for example event-driven data like measurements of voting data. For example, time-sensitive data can comprise data related to measurements, audio, video, sensors, and/or motor positioning.

In the particular example of FIG. 1, the second and the third network devices 200 and 300 are electronic control units (ECU) communicating with each other via the wireless network 1. Particularly, the second network device 200 receives signals transmitted by sensors. Each of the time-sensitive data clock domains 201a and 201b comprise an analogue-to-digital converter A/Da and A/Db respectively. The analogue-to-digital converters A/Da and A/Db digitise received measurement signals by the sensors. Those digitised signals are time-sensitive data or time-critical data, respectively, and shall be exchanged with the third network device 300 via the wireless network 1.

Particularly, the third network device 300 processes the received time-sensitive data sent by the second network device 200. By digital-to-analogue converters D/Aa and D/Ab, time-sensitive data clock domains 301a and 301b can convert the digitised signals into analogue signals again. These digitised signals can be an output of the third network device 300 and can be used to control further components.

In the following particular example, time-sensitive data between the time-sensitive data clock domain 201a and the time-sensitive data clock domain 301a shall be exchanged via the wireless network 1. For this data exchange, the time-sensitive data clocks VCXOa of the time-sensitive data clock domain 201a and of the time-sensitive data clock domain 301a have to be synchronised with the master clock 100, according to a preferred embodiment of the method according to the invention. In the following, it is described how the time-sensitive data clock VCXOa of the time-sensitive data clock domain 201a is synchronised with the master clock 100. The following description is valid for the synchronisation of the time-sensitive data clock domain 301a analogously.

For reasons of simplicity, in the following description the time-sensitive data clock is referred to as slave clock VXCOa and the time-sensitive data clock domain 201a is referred to as slave 201a. The time-sensitive data, which shall be exchanged, is simply referred to as exchange-data.

The master 100 transmits appropriate data, particularly appropriate signals, messages and/or requests, to the slave. Preferably, this data is exchanged in form of data packets. In the following description, these appropriate data and/or appropriate data packets are referred to as synchronisation-data.

The master 100 transmits or sends these synchronisation-data to a timestamp section Ta of the slave 201a and vice versa. With these signals, a drift as well as an offset between the master clock 100 and the slave clock VCXOa is determined according to the invention. The timestamp section Ta communicates with a servo control SCa in the local clock domain 210. The servo control SCa controls and adjusts the slave clock VCXOa and compensates for the drift and the offset.

The method of synchronising the slave clock VCXOa and the master clock 100 according to the invention will be described in detail in relation to FIG. 2.

If the slave clocks VCXOa of the time-sensitive data clock domains 201a and 301a are synchronised with the master clock 100, the exchange-data can be exchanged between the second and the third network device 200 and 300. The slave clock VCXOa of the slave 201a transmits the synchronized time or time signal to the analogue-to-digital converter A/Da. The analogue-to-digital converter A/Da transmits the exchange-data with an according timestamp to a sample section Sa. The sample section Sa transmits the exchange-data to a packetizing section P in the local clock domain 210. In the packetizing section P, the exchange-data are prepared for transmission. Particularly the exchange-data are divided into packets.

The exchange-data are sent to the third network device 300 via a data transmission clock domain 220. The data transmission clock domain 220 comprises an own clock, the data transmission clock, which is used for physical packet transformation and/or physical data transformation. Besides the exchange-data, also the synchronisation-data to and from the master 100 are sent and received in the data transmission clock domain 220.

The network device 300 receives the sent exchange-data via its transmission clock domain 320. In the packetizing section P of the local clock domain 310, the exchange-data can be unpacked by a parsing, i.e. a syntactic analysis. The unpacked exchange-data is transmitted form the packetizing section P to the sample section Sa of the time-sensitive data clock domain 301a and to the digital-to-analogue-converter D/Aa. The slave clock VCXOa of the slave 301a transmits the synchronized time or time signal to the digital-to-analogue converter D/Aa.

The above description is valid in an analogue way for a timestamp section Tb, a servo control SCb, sample section Sb, and the voltage controlled crystal oscillator VCXOb of the time-sensitive data clock domains 201b and 301b.

All time sensitive-data clocks VCXOa, VCXOb have a relation to the master, in particular to the master's absolute time. This relation is maintained by the servo controls SCa and SCb in the local dock domain 210 (310). With the Time of Day as the master's absolute time, it is possible to transmit time-sensitive data between multiple non-deterministic networks, particularly between multiple wireless networks. Each of these non-deterministic networks, especially wireless networks, can be constructed similar to the wireless network 1 depicted in FIG. 1. Each wireless network is provided with its own master clock.

FIG. 2 shows schematically a preferred embodiment of the invention, in which the slave clock VCXOa and the master clock 100 are synchronised, as a flow chart. The clocks VCXOa and 100 are synchronised in a step-based approach. The flow chart of FIG. 2 represents the synchronisation-data exchanged between the first network device 100 and the second network device 200, in general, and, respectively, between the time-sensitive master clock device 100 and the slave the time-sensitive data clock domain 201a, in particular.

The vertical axes are time axes, symbolising at which time the master and slave transmit synchronisation-data to each other. The left time axis represents the master, the right time axis represents the slave.

Figure 2A:
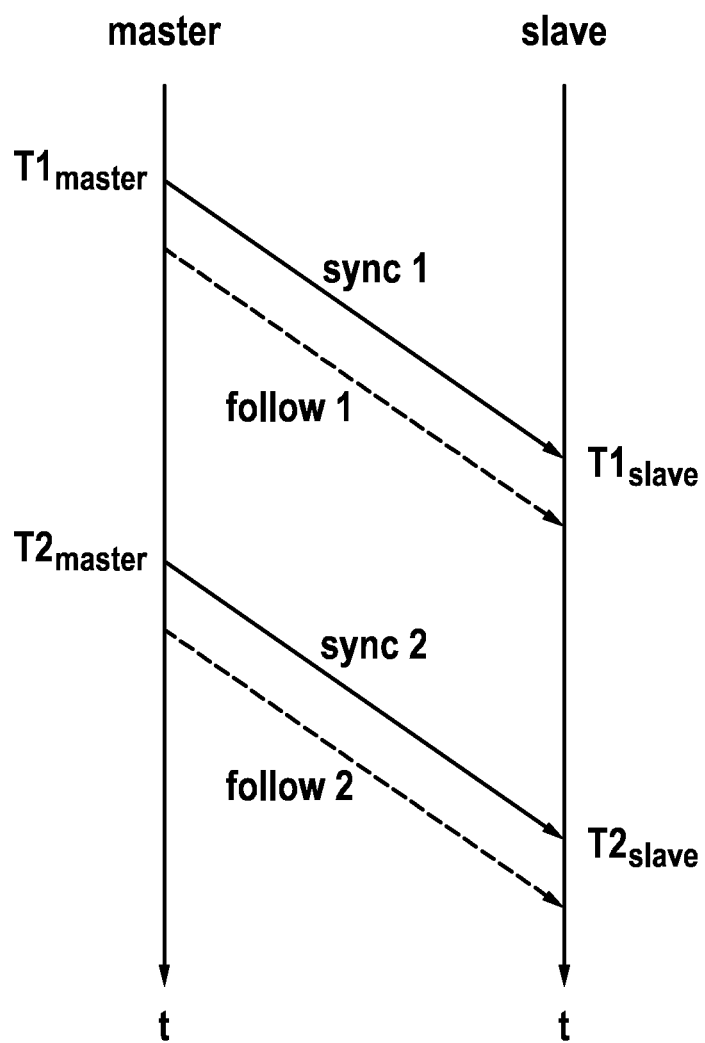

FIG. 2a represents a first step (an analysing step) of a preferred embodiment of a method according to the invention, in which the drift between the master clock and the slave clock is determined.

At a first transmission-time T1master the master transmits a first synchronisation message sync1 as synchronisation-data to the slave. At a first receive-time T1slave the slave receives the first synchronisation message sync1.

At a second transmission-time T2master the master transmits a second synchronisation message sync2 as synchronisation-data to the slave. At a second receive-time T2slave the slave receives the second synchronisation message sync2.

The drift is determined taking into account the first receive-time T1slave, the second receive-time T2slave, the first transmission-time T1master and the second transmission-time T2master. Preferably, the drift is determined as a ratio between the receive-time difference and the transmission-time difference. Preferably, the drift is determined according to the following formula:

$$\text{drift} = \frac{T2\text{slave} - T1\text{slave}}{T2\text{master} - T1\text{master}}$$

In a second step (a drift compensation step) the drift is compensated for in the slave. In particular, the timestamp section Ta transmits this determined drift to the servo control SCa. The servo control SCa controls the voltage controlled crystal oscillator VXCOa accordingly, so that the drift is compensated for. The slave and master are in a stable situation.

Figure 2B:
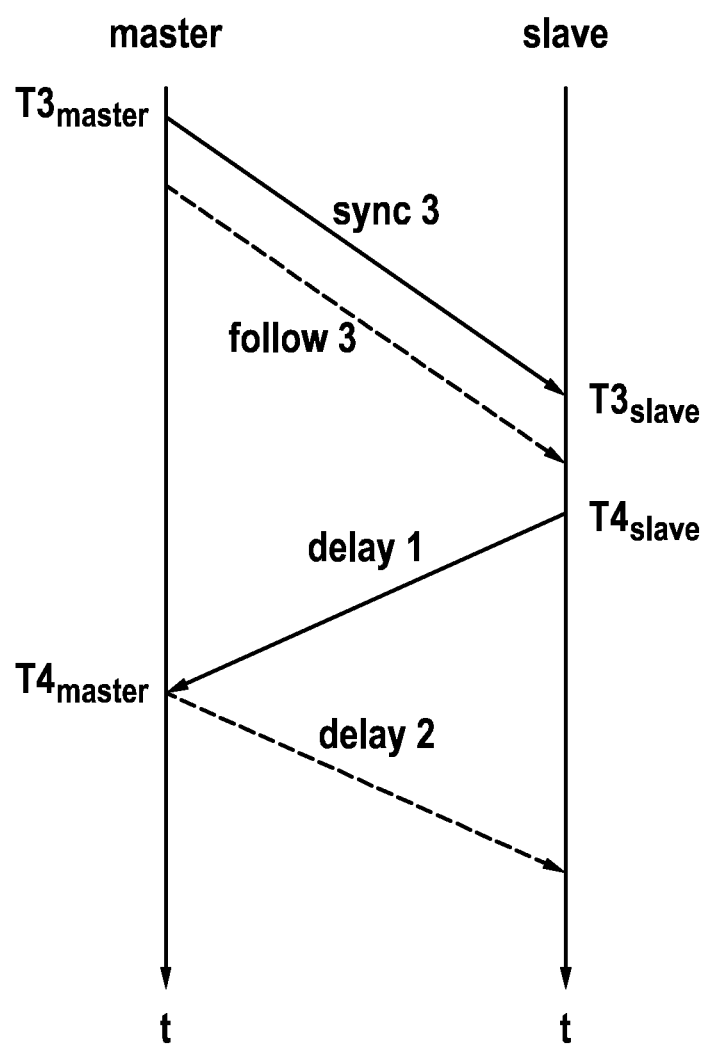

In the course of the synchronisation messages, the master can also transmit follow-up messages to the slave. The follow-up messages contain the information, at which exact time the master sent the synchronisation messages to the slave. A first follow-up message follow1 hence contains the exact first transmission-time T1master. A second follow-up message follow2 contains the exact second transmission-time T2master FIG. 2b represents a third step (an offset correction step) of a preferred embodiment of a method according to the invention, in which the offset between the master clock 100 and the slave clock VCXOa is determined and compensated for.

At a third transmission-time T3master the master transmits a third synchronisation message sync3 as synchronisation-data to the slave. At a third receive-time T3slave the slave receives the third synchronisation message sync3.

There exists the following relation between the third transmission-time T3master and the third receive-time T3slave:

T3slave−T3master=offset+Tdelay

Tdelay is a delay time, i.e. the time it takes to transmit data (particularly synchronisation-data) between the master and the slave.

The exact third transmission-time T3master can be delivered in the course of a third follow-up message follow3.

At a fourth transmission-time T4slave the slave transmits a delay request delay1 to the master. At a fourth receive-time T4master, the master receives the delay request delay1. After receiving the delay request at receiving-time T4master, the master transmits (instantaneously) a delay response delay2 to the slave, as a response to the delay request delay1.

There exists the following relation between the delay time and the fourth receive-time T4master:

$$Tdelay = \frac{1}{2}(T4\text{master} - T4\text{slave}^*)$$

with:

T4slave*=T4slave−(offset+Tdelay)

This relation corresponds to an assumption that the delay is symmetrical, i.e. that the average time for a data transmission from the master to the slave equals the average time for a data transmission from the slave to the master and that this average time is constant or changes negligibly with time.

With the above relations, the offset can be determined. The offset is preferably determined taking into account the third receive-time T3slave, the third transmission-time T3master, the fourth transmission-time T4slave and the fourth receive-time T4master. Preferably, the offset is determined according to the following formulae:

offset=(T3slave−T3master)−Tdelay with:

$$Tdelay = \frac{1}{2}(T4\text{master} - T4\text{slave}^*)$$

With the offset (and hence the delay) determined, the offset (and hence the delay) can be compensated for, analogously to the drift. With the method according to the invention, it is possible to correct the drift, offset and the delay for the slave clock very smooth and fast.

If the drift can be compensated rapidly after the second receive-time T2slave or if only a minimal drift was determined, it will be not necessary to transmit the third synchronisation message sync3. In this case, the second transmission-time T2master and the second receive-time T2slave are used as input for the delay and offset calculation. In this case, the third transmission-time T3master is replaced with the second transmission-time T2master and the third receive-time T3slave is replaced with the second receive-time T2slave in the above formulae:

offset=(T2slave−T2master)−Tdelay with:

$$Tdelay = \frac{1}{2}(T4\text{master} - T4\text{slave}^*)$$

The offset is hence determined taking into account the second receive-time T2slave, the second transmission-time T2master, the fourth transmission-time T4slave and the fourth receive-time T4master.

Due to the method according to the invention, the slave is set to be in the correct period and the clocks of the slave and the master are synchronised. In order to maintain the synchronisation over time, an adaptive compensation can be applied in a fourth step (an adaptive compensation step). This adaptive compensation takes care of compensating the last in period offset using the drift. In course of the adaptive compensation the controlled crystal oscillator VXCOa is controlled accordingly by the servo control SCa.

By the separation and decoupling of the system/local clock VCXO of the local clock domain 210 and the adjustable slave clock VCXOa of the time sensitive data clock domain 201a according to the invention, the servo control SCa is not influenced or triggered by the receive-times of the synchronisation-data. The synchronisation-data deliver information to determine the offset and the drift. The servo control SCa runs in his own domain, the local clock domain, decoupled from the time sensitive data clock domain 201a and the data transmission clock domain 220. The servo control SCa makes use of the offset and drift information. This decoupling makes servo control SCa more independent from network jitter performance.

For example, if the absolute time of the master clock is 35.7 seconds and the time of the slave clock is 25 s, then an (offset+Tdelay) value of −10.7 s is determined for the offset and the delay time. The frequency of the slave clock is for example f=48 Hz and the corresponding period time is:

$$T_{period} = \frac{1}{48 \text{ Hz}} = 20.833 \text{ s.}$$

Hence, in order to compensate for the offset (and delay time), a correction of $$T_{correction\_offset} = \frac{10.7\ s}{T_{period}} = 513608$$

is determined, i.e. an adjustment of 513608 periods must be applied.

In order to compensate for the drift, a correction of $$T_{correction\_drift} = 4.536\ \mu s$$

is determined.

With the method according to the invention, synchronisation between the master clock and the slave clock can be achieved in a short amount of time, faster than with an adaptive approach, continuous drift compensation or a control-loop.

In order to lock the slave clock to the master clock according to the invention, three synchronisation messages, (at least) one follow-up message, one delay request/response sequence and the time to drift within the last period are needed.

With synchronisation messages sent e.g. four times a second, e.g. each 250 ms, three synchronisation messages need the time of 750 ms.

A delay request and a delay response are exchanged in the delay time each. Hence one delay request/response sequence needs the time of two times the delay times. A typical delay time is 1 ms.

With a drift of 20 ppm (parts per million), the time to drift within the last period is:

$$\frac{4.536\ \mu s}{20 \times 10^{-6}} = 226.8\ ms.$$

Hence, the time the time to synchronise the slave clock and the master clock is 979.8 ms.

If the drift can be compensated rapidly after the second receive-time T2slave or if only a minimal drift was determined and if it is hence not necessary to transmit the third synchronisation message sync3, synchronisation will be achieved even faster. In this case, only two synchronisation messages have to be sent. Hence the time to synchronise the slave clock and the master clock is reduced by 250 ms to 729.8 ms.

The invention claimed is:

1. A method of synchronising clocks of network devices (100, 200),
   wherein each network device (100, 200) comprises at least one clock,
   wherein a first clock of a first network device (100) and a second clock (VCXOa) of a second network device (200) differ by an offset and the offset changes over time due to a drift and
   wherein the second clock (VCXOa) of the second network device (200) is synchronised with the first clock of the first network device (100), characterised in, that the second clock (VCXOa) of the second network device (200) is adapted separately from any other clocks of the second network device (200) and separately from any other clock of any other network device and that the drift between the first clock of the first network device (100) and the second clock (VCXOa) of the second network device (200) is determined and compensated for:
   wherein
   the drift between the first clock of the first network device (100) and the second clock (VCXOa) of the second network device (200) is determined in a first step,
   the determined drift between the first clock of the first network device (100) and the second clock (VCXOa) of the second network device (200) is compensated for in a second step,
   wherein the offset between the first clock of the first network device (100) and the second clock (VCXOa) of the second network device (200) is determined and compensated for in a third step.

2. The method of claim 1, wherein the offset between the first clock of the first network device (100) and the second clock (VCXOa) of the second network device (200) is determined and compensated for.

3. The method of claim 1, wherein, in order to compensate for the offset, a change is applied to the second clock (VCXOa) of the second network device (200), which is an integer multiple of a time period of the second clock (VCXOa) of the second network device (200).

4. The method of claim 1, wherein the second clock (VCXOa) of the second network device (200) is a data clock.

5. The method of claim 4, wherein the second network device (200) comprises the data clock (VCXOa) and a system clock (XO), wherein the data clock (VCXOa) is adjusted separately from the system clock (XO) and is decoupled from the system clock (XO).

6. The method of claim 4, wherein a time-sensitive data domain (201a) of the second network device (200), which is characterised by the data clock (VCXOa), is decoupled and adjusted separately from a local clock domain (210) of the second network device (200), which is characterised by the system clock (XO).

7. The method of claim 1, wherein the second network device (200) transmits time-sensitive data via the network.

8. The method of claim 1, wherein the network is a wireless network, a bus network, a ring network, a star network or a half-duplex point-to-point link.

9. The method of claim 1, wherein determining the drift between the clock of the first network device (100) and the clock (VCXOa) of the second network device (200) comprises the following steps:
   the first network device (100) transmits a first synchronisation message (sync1) at a first transmission-time (T1master) and the second network device (200) receives the first synchronisation message (sync1) at a first receive-time (T1slave),
   the first network device (100) transmits a second synchronisation message (sync2) at a second transmission-time (T2master) and the second network device (200) receives the second synchronisation message (sync2) at a second receive-time (T2slave),
   the drift between the first clock of the first network device (100) and the second clock (VCXOa) of the second network device (200) is determined taking into account the first receive-time (T1slave), the second receive-time (T2slave), the first transmission-time (T1 master) and the second transmission-time (T2master).

10. The method of claim 9, wherein the drift is determined as a difference between the first receive-time (T1slave) and the second receive-time (T2slave) divided by a difference between the first transmission-time (T1master) and the second transmission-time (T2master).

11. The method of claim 1, wherein determining the offset between the clock of the first network device (100) and the clock (VCXOa) of the second network device (200) comprises the following steps:
the first network device (100) transmits a third synchronisation message (sync3) at a third transmission-time (T3master) and the second network device (200) receives the third synchronisation message (sync3) at a third receive-time (T3slave),
the second network device (200) transmits the delay request (delay1) at the fourth transmission-time (T4slave) and the first network device (100) receives the delay request (delay1) at the fourth receive-time (T4master),
the offset and the delay time are determined by the third receive-time (T3slave), the third transmission-time (T3master), the fourth transmission-time (T4slave) and the fourth receive-time (T4master).

12. The method of claim 1, wherein the network devices (100, 200) are in a non-deterministic network (1).

13. The method of claim 4, wherein the second clock (VCXOa) of the second network device (200) is a time sensitive data clock.

* * * * *